US008611294B2

(12) United States Patent
Haustein et al.

(10) Patent No.: US 8,611,294 B2
(45) Date of Patent: Dec. 17, 2013

(54) METHOD AND COMMUNICATION NETWORK ELEMENT FOR TRANSMITTING REFERENCE SIGNALS

(75) Inventors: Thomas Haustein, Potsdam (DE); Egon Schulz, München (DE); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 288 days.

(21) Appl. No.: 13/132,160

(22) PCT Filed: Dec. 3, 2008

(86) PCT No.: PCT/EP2008/066687
§ 371 (c)(1),
(2), (4) Date: Jun. 1, 2011

(87) PCT Pub. No.: WO2010/063317
PCT Pub. Date: Jun. 10, 2010

(65) Prior Publication Data
US 2011/0235607 A1    Sep. 29, 2011

(51) Int. Cl.
*H04W 4/00* (2009.01)
(52) U.S. Cl.
USPC ............................................ 370/329; 370/335
(58) Field of Classification Search
USPC .................................................. 370/329, 335
See application file for complete search history.

(56) References Cited

U.S. PATENT DOCUMENTS

| | | | | |
|---|---|---|---|---|
| 2008/0267269 | A1* | 10/2008 | Enescu et al. ................. | 375/219 |
| 2009/0046570 | A1* | 2/2009 | Sarkar et al. .................. | 370/203 |
| 2011/0176480 | A1* | 7/2011 | Dahlman et al. .............. | 370/328 |

FOREIGN PATENT DOCUMENTS

| | | |
|---|---|---|
| CN | 101005340 A | 7/2007 |
| CN | 101296030 A | 10/2008 |
| JP | 2008092374 A | 4/2008 |
| JP | 2008109670 A | 5/2008 |
| JP | 2008278341 A | 11/2008 |
| JP | 2010109714 A | 5/2010 |

OTHER PUBLICATIONS

R1-062020, 3GPP TSG RAN WG1 Meeting #45, Tallinn, Estonia, Aug. 28-Sep. 1, 2006, Intel Corporation, NTT DoCoMo, "Reference Signal Design in Downlink MIMO", 6 pgs.
R1-060185, 3GPP TSG RAN WG1 LTE Ad Hoc Meeting, Helsinki, Finland Jan. 23-25, 2006, Nokia, "OFDMA Downlink Reference Signal Structure—Text Proposal", 3 pgs.
R1-083532, 3GPP TSG RAN1 #54bis, Prague, Czech Republic, Sep. 29-Oct. 3, 2008, Texas Instruments, "Common Reference Symbol Mapping/Signaling for 8 Transmit Antenna", 6 pgs.
Zirwas, W., et al., "Distributed Organization of Cooperative Antenna Systems", Jan. 1, 2007, Distributed Antenna Systems, pp. 279-311.
Motorola; "Common Reference Symbol Mapping/Signaling for 8 Transmit Antennas"; 3GPP TSG RAN #54, R1-083224; Aug. 18-22, 2008; Jeju, Korea; whole document (5 pages).
NTT Docomo; "Support of DL Higher-Order MIMO Transmission in LTE-Advanced"; 3GPP TSG RAN WG1 Meeting #54bis, R1-083685; Sep. 29-Oct. 3, 2008; Prague, Czech Republic; whole document (8 pages).
Nortel Networks; "RS design considerations for high-order MIMO in LTE-A"; TSG-RAN1 #54, R1-083157; Aug. 18-22, 2008; Jeju, Korea; whole document (6 pages).

* cited by examiner

*Primary Examiner* — Sai-Ming Chan
(74) *Attorney, Agent, or Firm* — Harrington & Smith

(57) ABSTRACT

In the field of wireless communications where a communication network has cooperative antenna systems, a method, apparatus, and computer program product for transmitting reference signals in the communication network from a first network element to a second network element are disclosed herein. The transmission of reference signals includes transmitting a first type of reference signals, which are related to a first communication system, using a first resource of a frame, and transmitting a second type of reference signals, which are related to a second communication system, using a second resource of the frame.

20 Claims, 6 Drawing Sheets

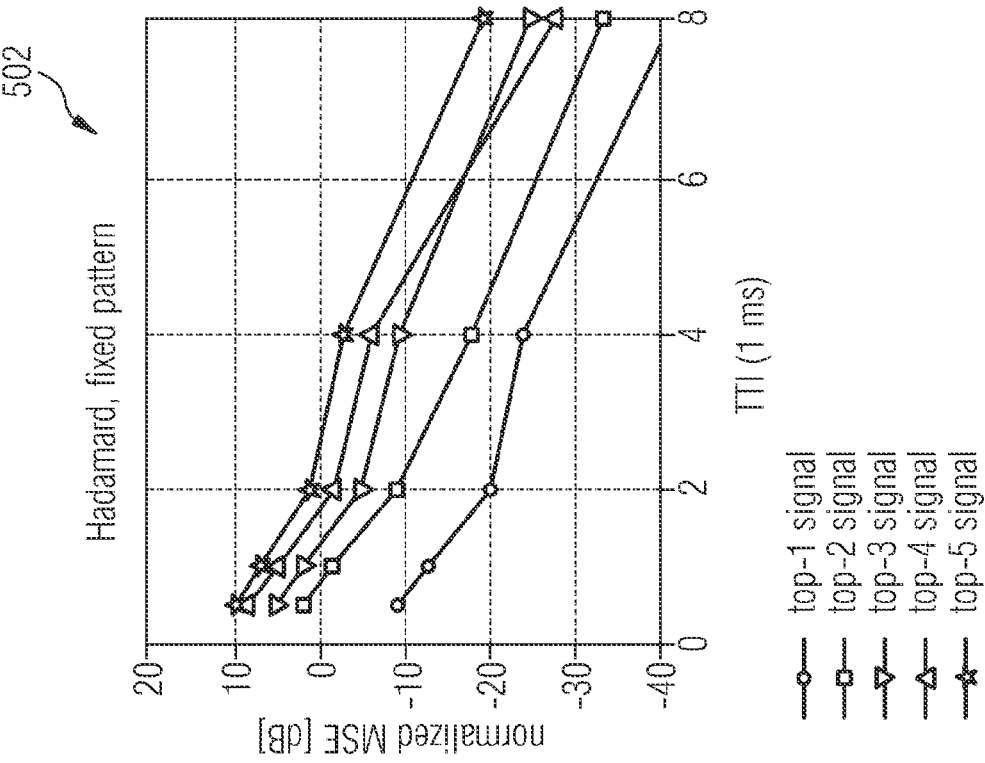
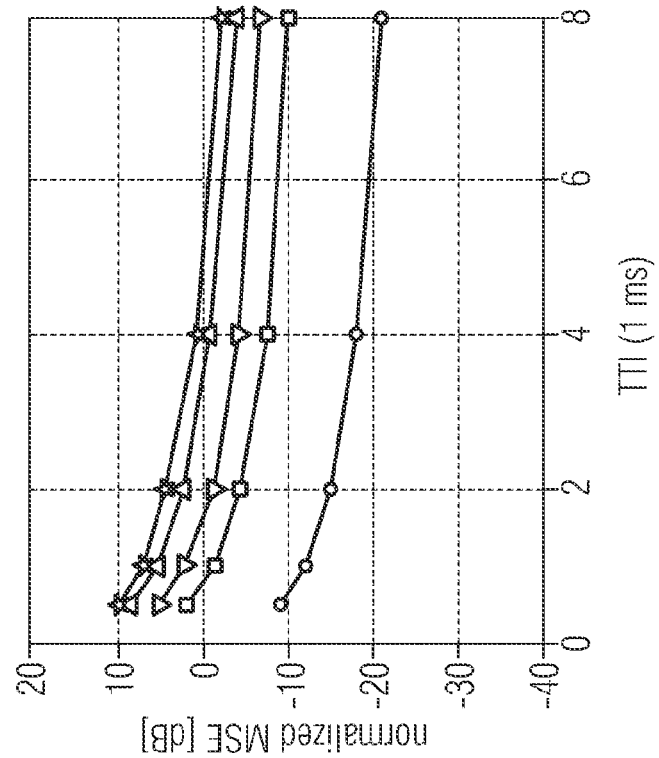
FIG 5 subframe with combination of LTE R8 and LTE advanced reference signals

METHOD AND COMMUNICATION NETWORK ELEMENT FOR TRANSMITTING REFERENCE SIGNALS

FIELD OF INVENTION

The present invention relates to the field of communication network elements and methods of transmitting data, in particular, in communication networks having cooperative antenna systems. Furthermore, the present invention relates to a communication network system, a program element and a computer readable medium.

ART BACKGROUND

Nowadays mobile communication networks are widely used. These communication networks comprise a plurality of network cells each having at least one base station used to receive and transmit signals from user equipment, e.g. mobile phones or PDAs. A plurality of different environments or systems is known, e.g. GERAN, UTRAN, LTE, E-UTRAN, WCDMA, or WLAN. For ensuring a good performance and in particular an effective data transmission it has to be ensured that all data, data signals, or data packets are received at the intended recipient and at possible relay stations, like base stations of the mobile communication network.

One problem limiting the performance of the data transmission known in the prior art is inter cell and intra cell interference. In order to reduce the inter cell interference some form of cooperative antenna (COOPA) systems are proposed. From theory significant performance gains with respect to capacity and coverage are known for full cooperating cellular radio systems compared to conventional ones. Due to these large gains, which cannot be achieved with other technologies, as it is known from theory that COOPA systems provide an upper bound for interference limited cellular radio systems. At the same time it is clear that full cooperation is not practical due to required channel state information (CSI) to a huge number of base stations (BS) and accordingly large feedback overhead, especially in case of FDD systems. A further topic is the large amount of data on the backbone network, which might generate a lot of costs in terms of CAPEX and OPEX.

In particular, COOPA based on intra eNodeB (eNB) cooperation between adjacent sectors of the site is promising as the most basic cooperation scheme, as it can be implemented without any backbone network involved. Similar are distributed antenna systems (DAS), where the antenna elements (AE) of each sector are spatially distributed. The Tx stations—typically remote radio heads (RRH)—are connected with the baseband unit at the eNB site over fibers, but without inclusion of the backbone network. While intra eNB cooperation can be implemented more easily, larger performance gains require additional cooperation over cells from different sites.

However, COOPA systems require accurate channel estimation, which has to be fed back to the eNBs, where it will be used for precoding in the cooperation area (CA). This channel estimation may be a major challenge, especially due to the inter cell interference from a large number of cells and sites in mobile communication systems. Optimum common references signal (CRS) design may be of utmost importance as a bad design may fundamentally limit the achievable performance for any cooperation scheme in the future.

Thus, there may be a need for a communication network element, a method for transmitting reference signals, a program element, and a computer readable medium providing an improved performance for a multi channel estimation, in particular in a cooperative antenna system.

SUMMARY OF THE INVENTION

This need may be met by the subject-matter according to the independent claims. Advantageous embodiments of the present invention are described by the dependent claims.

According to an exemplary aspect of the invention a method of transmitting reference signals in a communication network from a first network element to a second network element, wherein the method comprises transmitting first type of reference signals using a first resource of a frame wherein the first type of reference signals are related to a first communication system, and transmitting second type of reference signals using a second resource of the frame wherein the second type of reference signals are related to a second communication system.

In particular, the first communication system may be a cellular system, e.g. a 3GPP LTE system. An example for a GPP LTE system may be a system according to the LTE Release 8 standard. The second communication system may also be a cellular system, e.g. a so called advanced Release 8 communication system or LTE advanced communication system. In particular, the first type as well as the second type of reference signals may be common reference signals and/or may be COOPA reference signals. The transmitted reference signals may be used to generate channel state information, i.e. to estimate the actual performance of the channel which may be necessary for performing a cooperative data transmission.

According to an exemplary aspect of the invention a communication network element for transmitting reference signals is provided, in particular for a cooperative communication network, wherein the network element comprises a first transmitting unit adapted to transmit first type of reference signals using a first resource of a frame wherein the first type of reference signals are related to a first communication system, and a second transmitting unit adapted to transmit second type of reference signals using a second resource of the frame wherein the second type of reference signals are related to a second communication system.

In particular, the network element may be one out of the group of network elements consisting of an enhanced Node B (eNB), a user equipment, a base station, and a relay node. The first and second transmitting unit may be formed by a single unit or may be formed by different units, e.g. by one or more antennas, and may be operated under the control of a control unit. It should be noted that the network element, e.g. a base station, may mainly receive information like preferred matrix indices (PMIs) or channel quality indicators (CQIs) but may provide also some control information in the downlink.

In addition a communication network system may be provided which comprises a plurality of communication network elements, wherein the plurality of communication network elements includes at least two base stations and at least two user equipments, wherein at least one communication network element is a communication network element according to an exemplary aspect of the invention, and wherein the plurality of communication network elements are adapted to perform a cooperative transmission of data, in particular, of data packets.

According to an exemplary aspect of the invention a program element is provided, which, when being executed by a processor, is adapted to control or carry out a method according to an exemplary aspect of the invention.

According to an exemplary aspect of the invention a computer-readable medium, in which a computer program is stored which, when being executed by a processor, is adapted to control or carry out a method according to an exemplary aspect of the invention.

The term "resource" may particularly denote any kind of ability of the communication network in a specific communication system to transmit data independently whether the data are payload data, reference data, control data or the like. For example, different resources may be distinct from each other by the fact that they relate to different subframes of the same frame and/or different frequencies, e.g. two resources may relate to the same subframe but may relate to different frequencies, i.e. the data transmitted by using the two resources may be transmitted on different frequencies. In general, resources may be distinguishable from each other by any suitable parameter, e.g. frame number, subframe number, used frequency band, coding scheme or the like.

By a method according to an exemplary aspect of he invention it may be possible to ensure a backward compatibility of a communication system relating to a new standard, e.g. it may be possible to combine a Release 8 standard with an LTE advanced standard by using two different types of reference signals wherein one type may be adapted to be used in Release 8 communication systems or transmission schemes while the other one may be adapted to be used in an advanced LTE standard. Each of the two reference signals may be a common reference signal, e.g. may be common for all channels. Since both types of reference signals may be specifically adapted to one standard it may be possible to ensure a high accuracy of the channel state estimation (CSI), which may even facilitate interference rejection combining (IRC) which may be seen as another significant ingredient of COOPA systems and which may rely as well on high quality CSI estimation.

A gist of an exemplary aspect may be seen in providing a method for sending or transmitting reference signals for a cooperative data transmission scheme wherein the method may provide a backward compatibility with respect to former schemes and may allow for improved multi cell channel estimation. A basic idea may be to reserve one subframe of a communication system frame or communication scheme frame, e.g. an LTE Release 8 radio frame, completely or partly for transmitting or transmitting LTE advanced common reference signals (CRSs) for multi cell channel estimation. When using a method according to an exemplary aspect of the invention it may be possible to reduce overlap of data and CRSs from different cells, which overlap may lead to an interference floor for the CRSs due to the data transmission since data signals cannot be controlled.

Next, further exemplary embodiments of the method of transmitting data are described. However, these embodiments also apply to the communication network element, the communication network system, the program element, and the computer readable medium.

According to another exemplary embodiment of the method the first type of reference signals and the second type of reference signals are transmitted in different subframes.

That is, the first resource and the second resource may be related to different subframes. For example, the first type of reference signals, e.g. relating to Release 8, may be transmitted using resources as specified by the Release 8 standard, while the second type of reference signals, e.g. relating to an advanced Release 8 system or LTE Advance, may be transmitted only during a specific subframe, e.g. the first subframe.

According to another exemplary embodiment of the method the first type of reference signals and the second type of reference signals are transmitted in a common subframe.

In particular, the first type and the second type of reference signals may only be transmitted during a specific subframe, e.g. the first or any other suitable subframe, while during the other subframes no reference signals may be transmitted. Of course the reference signals may also be transmitted during two or more subframes. That is, even in subframes carrying reference signals of the second type, e.g. LTE advanced CRSs the respective network element, for example an eNBs, may transmit reference signals, e.g. a reference grid, as defined by another standard, e.g. the LTE Release 8 standard.

According to another exemplary embodiment of the method the first resource relates to a first frequency band of a subframe.

It should be noted that of course the second resource may also relate to a specific frequency band, e.g. the first frequency band or to another specific frequency band.

According to another exemplary embodiment of the method in a first frame the first reference signal is transmitted using the first frequency band and wherein in a second frame the first reference signal is transmitted using another frequency band.

That is, for each consecutive frame another frequency band may be allocated for the transmission of the reference signals. In particular, the allocation for the reference signals of LTE advanced communication system may be changed. It should be noted that of course it may be possible that after a given number of changes of the allocated frequency bands the frequency band allocated in the first frame may be used again. For example, in a first frame a first frequency band may be used, in a second frame a second frequency band may be used, in a third frame a third frequency band may be used, while in a fourth frame the first frequency subband may be used again.

According to another exemplary embodiment of the method the first type and/or the second type of reference signals are generated according to a Hadamard sequence.

In particular, Hadamard sequences may be applied for CRS of different cells of the communication network. The use of Hadaman sequences may decrease or minimize inter-cell crosstalk between reference signals from different cells. For example a subframe may carry a combination of LTE Release 8 CRS together with LTE advanced reference signals at resources not occupied by LTE Release 8 reference signals. Furthermore, it may be possible to do an allocation of the resources used for the transmitting of the reference signals, e.g. the first type of reference signals and/or the second type of reference signals, in such a way that nearby interferers, e.g. eNBs or UEs, have been allocated sequences, which are orthogonal already for short sequence lengths. Since the nearby interferer typically generate more interference, it may be advantageous to ensure that nearby interferers have been sequences allocated which are orthogonal already for short sequence lengths. For example, the LTE Release 8 CRSs may be multiplied by Hadamard or Walsh Hadamard sequences.

According to another exemplary embodiment of the method the second reference signals are allocated for a specific bandwidth of the frame.

In particular, the second reference signals, e.g. the common LTE advanced reference signals, are only transmitted in a predetermined part of the full spectrum bandwidth. That is, the second reference signals are only transmitted using specific resources, e.g. specific frequencies subbands. Thus, the cooperation may be restricted to the specific bandwidths corresponding to the specific subbands, e.g. this part of the spectrum, so that the overhead caused by the transmission of the reference signals may be decreased or limited. Of course this specific subband or these specific subbands may be changed during transmission. In particular, the location and the size of this frequency subband or these frequencies subbands may be allocated semistatically by the eNBs. For example, a semistatically definition of the number of used frequency subbands, i.e. a changing of a configuration defining the used frequency subbands, may be used, which might be useful to adapt to different radio conditions. In particular, in case the radio conditions get worse the number of frequency subbands used for transmitting the first reference signals and/or the second reference signals may be increased and vice versa.

According to another exemplary embodiment of the method for the transmitting of the first reference signal type in the first frame a first subband is used, and/or wherein for the transmitting of the second reference signal type in the first frame a second subband is used, wherein for the transmitting of the first reference signal type in a second frame a third subband is used, and/or wherein for the transmitting of the second reference signal type in the second frame a fourth subband is used.

That is, the subband used for transmitting the first and/or the second reference signals may be changed from frame to frame, which may allow using the full frequency band for cooperation. In that case a scheduler might take into account that some parts of the spectrum, i.e. the full frequency band, have more outdated CSI information than other parts of the spectrum. In particular, the third subband and/or the fourth subband may be a subband which fulfil a predetermined criterion, e.g. may be subband(s) which were not used for transmitting reference signals (first or second type) for a predetermined time period, e.g. may be the subband(s) corresponding to channels which were not estimated for a predetermined time period. Thus, it may be possible to ensure that all channels are equally or at least more equally estimated.

According to another exemplary embodiment of the method only parts of a subframe are used for transmitting reference signals of the first type and/or of the second type.

In particular, other parts of the subframe may be used to transmit payload data. The payload data may be transmitted according to the first communication system or may be transmitted according to the second communication system independently whether the reference signals transmitted in the subframe are of the first type or of the second type.

According to another exemplary embodiment of the method the reference signals of the first type and the reference signals of the second type are combined.

For example, common CRS for Release 8 UEs may be combined with common LTE advanced CRSs, e.g. in the subframe the LTE advanced CRSs are transmitted. In particular, the so called maximum ration combining (MRC) approach may be used possibly taking into account the outdating of the LTE advanced multi cell channel estimation, i.e. taking into account information about the last performed channel estimation of the LTE advanced communication scheme. More clever combining schemes might be possible taken into account the different structure and properties of the common CRSs according to LTE Release 8 and that of the LTE Advanced reference signals. For example, while the performance of the common Release 8 CRSs suffer from multi cell interference the LTE advanced reference signals will have a lower time localisation. Fast iterative decoding techniques might be able to extract the most performance out of the combination of both types of channel estimates. By performing such a combining the overall channel estimation accuracy may be increased.

According to another exemplary embodiment of the method the reference signals of the first type and/or of the second type are used for tracking of a movement of a network element of the communication network.

In particular, the first type reference signals, e.g. the Release 8 reference signals, may be used for tracking of a moving network element, e.g. a UE, a mobile phone, laptop, PDA or alike, which may increase the performance of the channel estimation and thus of a transmitting of data in case the UEs is moving, in particular in case the UE is moving a little bit faster.

According to another exemplary embodiment the method further comprises transmitting a control message which informs the second network element about an availability and/or the location and/or the density of the transmitted reference signals of the first and/or second type.

The term "channel" may particularly denote any kind of transmission path which can be used for transmitting data packets and which is distinguishable from another transmission path. That is, each "channel" may form a resource of the communication network which can be used to transmit data independently from other resources. Such a "channel" may be formed by a resource block (RB) comprising several subcarriers. For example, an RB may consist of 12 subcarriers point 14 OFDM symbols.

In this application the term "data packet" may particularly denote every kind of data which can be transmitted either via cable or line or wireless. In particular, the term "data" may include digital or analogue data relating to a phone call or a transmission of data as used in the connection with computer communications, e.g. programs, pictures, music title, or the like. In particular, the specific data may be formed by one or more data packets.

Summarizing an exemplary aspect of the present invention may be the providing of a method allowing for improved multi cell channel estimation in combination with full backward compatibility by reserving one out of the 10 subframes of a LTE radio frame either completely or partly for LTE Advanced CRSs for multi-cell channel estimation. This may provide full design flexibility for the multi cell CRSs for LTE Advanced. At the same time full backward may be assured by continuous transmission of Release 8 compatible reference signals on AP0, . . . , 3 and AP5. Even in the subframe carrying LTE Advanced CRSs the eNBs may send the reference signal grid as defined in the current standard.

The other resource elements normally carrying R8 data signals may then be used for new CRSs for LTE Advanced. Specifically the application of Hadamard sequences for CRS of different cells might be applied, minimizing inter-cell crosstalk between reference signals from different cells. In a simple scheme specific subframes may carry a combination of LTE Release 8 CRS together with LTE Advanced reference signals at the other REs not occupied by R8 RSs. In that case Release 8 UEs may not see any of these newly defined reference signals as the eNBs simply do not schedule any Release 8 UEs in this specific subframe. The resulting additional overhead may be in the order of 10% (one out of 10 subframes). Furthermore, semistatically definition of other configurations with more or less subframes for LTE Advanced CRSs might be useful to adapt to different radio conditions.

The exemplary aspects and exemplary embodiments defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 5 schematically illustrates multi cell performances for different sequences.

DETAILED DESCRIPTION

Figure 1:
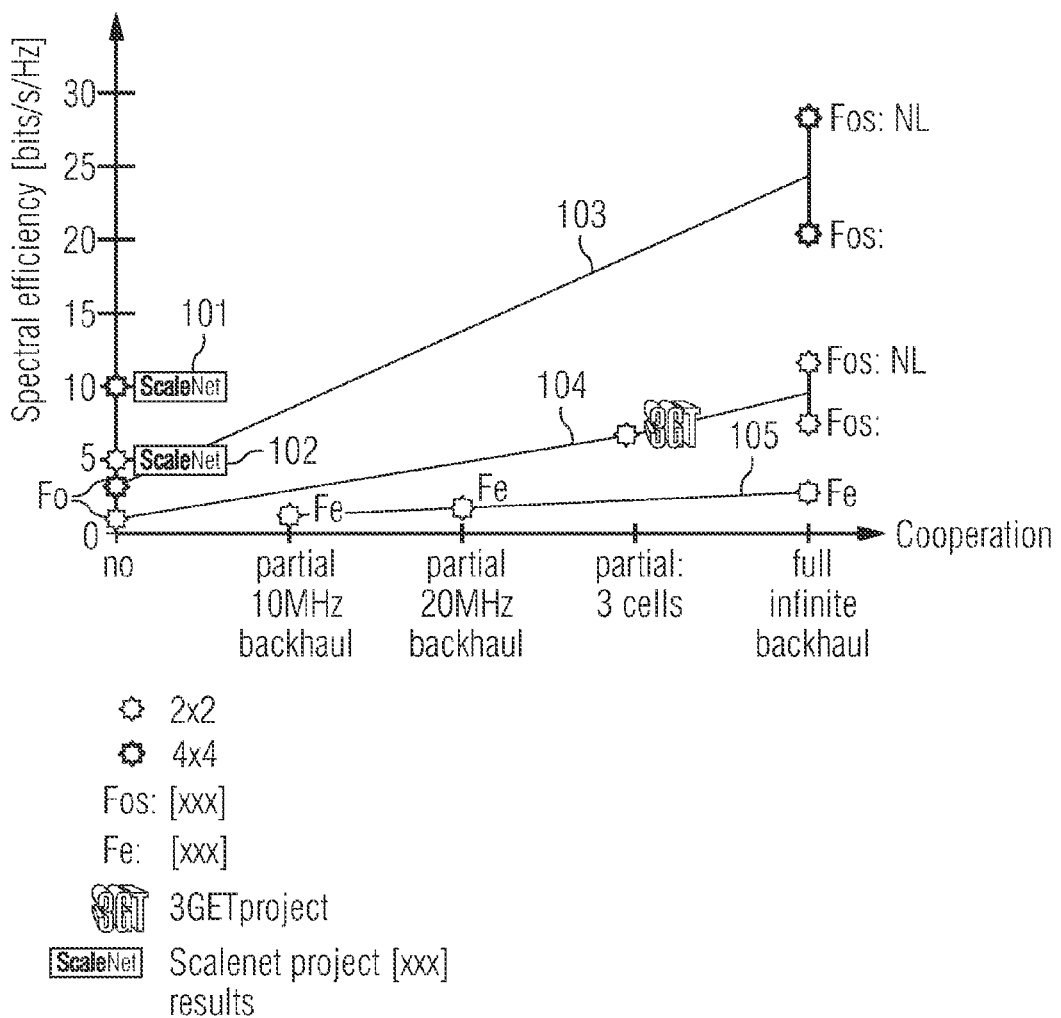
FIG. 1 schematically illustrates potential gains for different degrees of cooperation.

The illustration in the drawing is schematically. Identical or similar elements are labeled with identical or similar reference signs.

In the following, referring to FIGS. 1 to 3, some basic principles of a method of transmitting data and communication network elements according to exemplary embodiments will be explained.

FIG. 1 schematically illustrates potential gains for different degrees of cooperation. That is, FIG. 1 shows the spectral efficiency in bits per seconds and hertz (bits/(s*Hz)) over different levels of cooperation. In particular, several schemes are depicted for several degrees of cooperation. The spectral efficiency for the "ScaleNet" results 101 and 102 represent the results for optimum MU-MIMO systems without cooperation but with full channel state information (CSI) knowledge. Furthermore, the "Fo" lines 103 and 104 represent the theoretical upper bounds for each level of cooperation, while the line "Fe" 105 represents the results for a 5 MHz system with varying data rate on X2 between cooperating enhanced Node Bs (eNBs). From FIG. 1 it can be clearly seen that the spectral efficiency increases with increasing level of cooperation. This is in particular, the case for the "Fo" lines but the "Fe" line 105 as well increases from no cooperation over a cooperation corresponding to 10 MHz backhaul, 20 MHz backhaul, 3 cells and full, i.e. infinite backhaul. Additionally, the result for the 3GETproject is indicated by 106 which represents an active IF management scheme with cooperative areas (CAs) of size 3.

Figure 2:
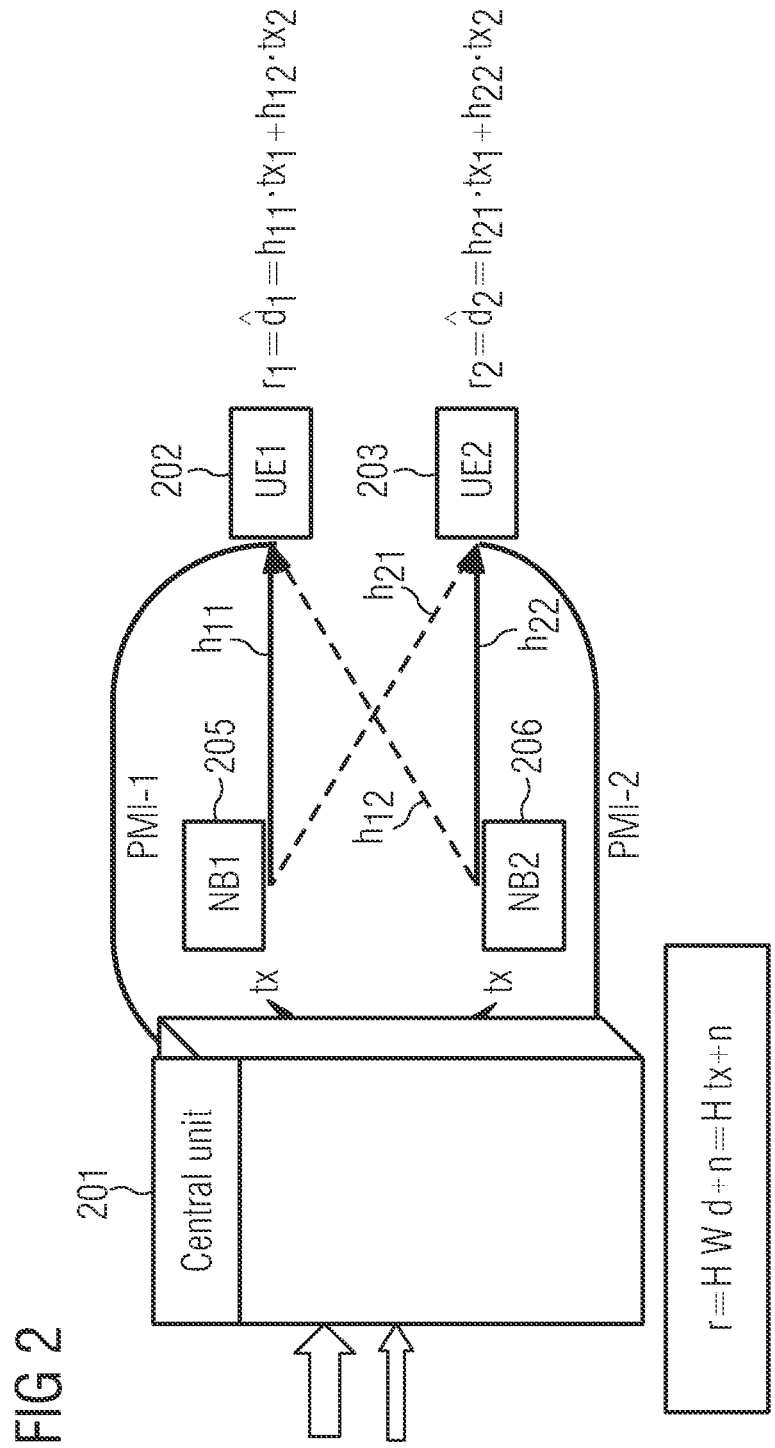
FIG. 2 schematically illustrates a basic solution for cooperative transmission.

FIG. 2 schematically illustrates a basic solution for cooperative transmission which is helpful for the understanding of the present invention. In particular, a central unit (CU) may be foreseen for cooperative antenna (COOPA) systems to perform a joint precoding and—as the name suggests—may be placed at a central point of the so called cooperation area (CA) at one of the cooperating eNBs. The other cooperating eNBs may be connected to this CU by fast and low delay fiber connections.

The CU may perform in downlink (DL) common signal precoding like joint transmission, which is basically a matrix multiplication of all data signals for all cooperating user equipments (UEs) with a precoding matrix W. In case of zero forcing (ZF) W is the pseudo inverse $H^+$ of the overall channel matrix H. The simplest form of a SA for a codebook based precoding is illustrated in FIG. 2. In this case, the precoding matrix W is selected from a codebook based on the different preferred matrix indices (PMI) feedbacks PMI1 and PMI2 from the UEs UE1 and 2. Similar concepts can be applied to the uplink (UL) as well, often denominated as joint detection (JD).

In particular, FIG. 2 shows data packets d1 and d2 to be transmitted to UE1 202 and UE2 203. For the common signal processing the data packets are encoded by using the matrix W 204 to form the data signals tx to be transmitted to eNB1 205 corresponding to UE1 202 and eNB2 206 corresponding to UE2 203, where signals $r_1$ and $r_2$ are received, respectively. The signals $r_1$ and $r_2$ correspond to the multiplication of the channel matrix H, the pseudo inverse $H^+$ or W and the data d to be transmitted offset by an offset n.

Figure 3:
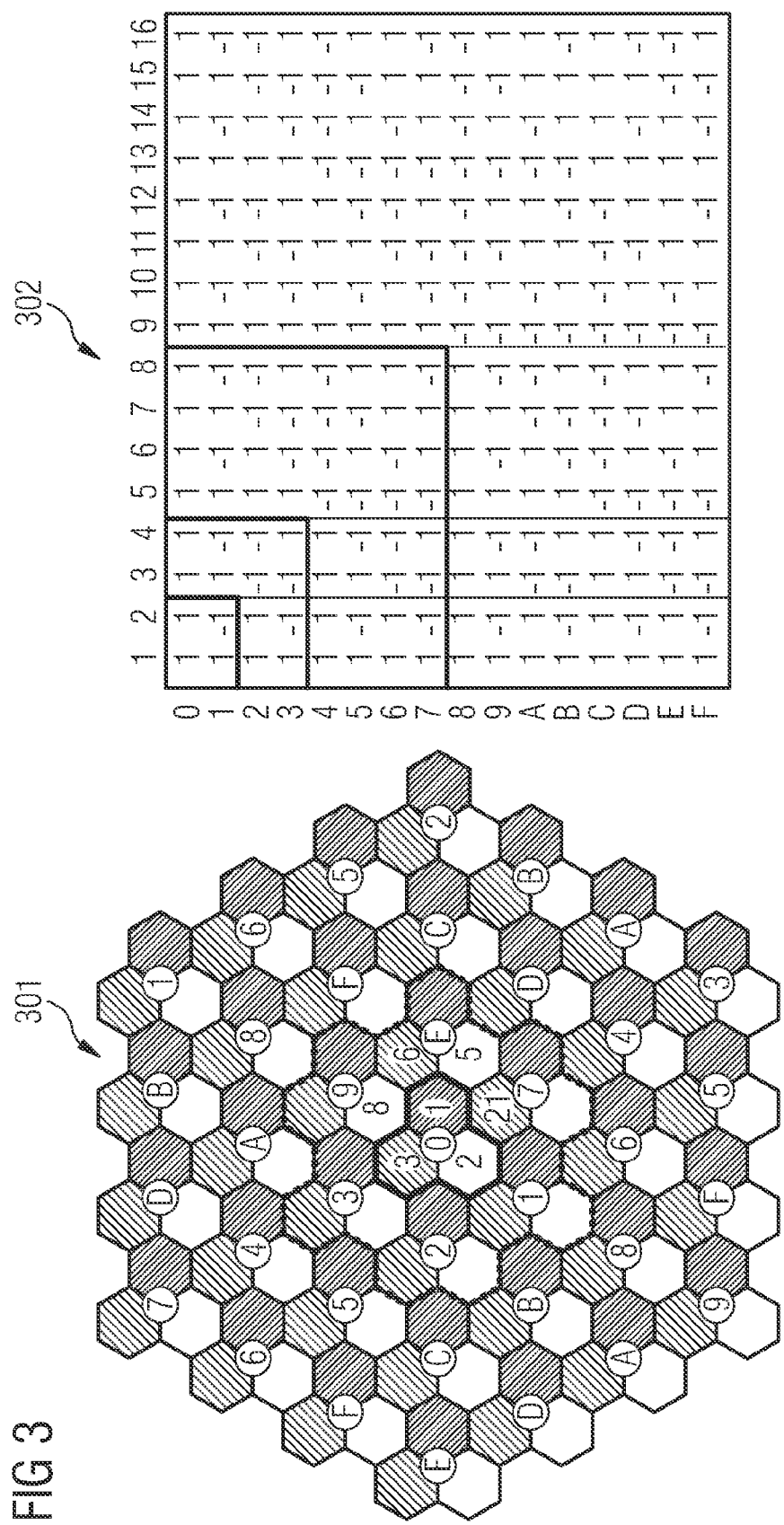
FIG. 3 schematically illustrates a conventional cellular layout.

In FIG. 3 top left a conventional cellular layout 301 consisting of a regular set of hexagonal cells can be found. Each cell preferably broadcast continuously a grid of common reference signals (CRS) for all antenna elements, i.e. for all physical antennas, as defined for LTE Release 8, i.e. for 2 or for 4 antenna ports (AP) per sector. For clarity reasons it should be noted that the term antenna port is generally used in the field of LTE and is also strongly related with the reference signals transmitted from this port. In case of common reference signals the APs may be connected with different physical antennas or antenna elements. The grid in time and frequency direction may be seen for one resource block in FIG. 3 on the right side 302. The UEs may do CSI estimation based on this CRS grid by proper interpolation algorithms.

For COOPA systems each UE estimates at least those radio channels to those eNBs which are involved in the CA the UE is attached to. To make things even more challenging, CSI accuracy for high performance COOPA systems should be better compared to conventional cellular systems, as otherwise precoding accuracy in downlink (DL) might be poor.

Interference rejection combining (IRC) may be seen as another significant ingredient of COOPA systems which may rely as well on high quality channel state information (CSI) estimation. In case of multicell scenarios the same CRSs are transmitted for synchronized networks at the same time so that there may be significant inter CRS interference between the different cells when using conventional communication systems. This issue may be partly overcome by assigning different cell ID specific sequences in the LTE standard. So in case of estimation over one full orthogonal frequency division multiplexing (OFDM) symbol—which is the length of the sequences—there may be some crosstalk reduction between the different common CRSs from different cells. But, as full orthogonality between all cells cannot be provided due to frequency selectivity of the radio channels, the residual channel estimation performance may still be poor when using conventional channel estimation.

Figure 4:
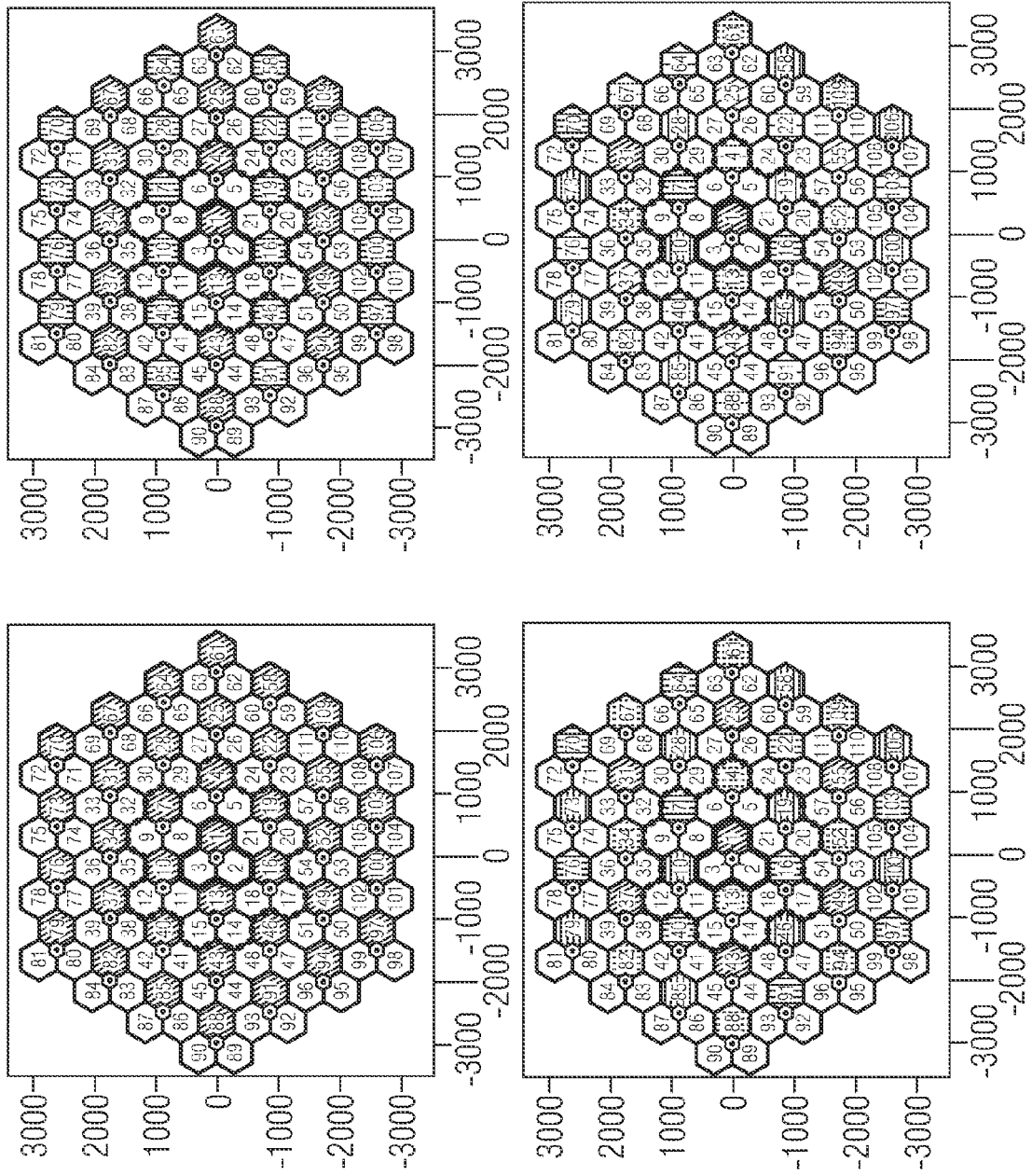
FIG. 4 schematically illustrates an allocation of Hadamard sequences to cells.

FIG. 4 schematically illustrates an allocation of Hadamard sequences to cells, in particular for sequences having different lengths. In particular the length of the Hadamard sequences increases from the left upper field of FIG. 4, via the right upper field, the left lower field to the right lower field. From FIG. 4 it can be seen that with increasing length of the sequences the spatial distances between cells having allocated the same Hadamard frequency increase, wherein for each Hadamard sequence a different hatching is used in FIG. 4.

FIG. 5 shows simulation results for random allocation of the cell ID specific sequences to cells on the left 501 and for a Hadamard fixed pattern on the right 502. As can be seen the achievable mean square error (MSE) for the top five strongest interferer may be quite bad, even in case of static radio channels and for an averaging over 8 subframes of length 1 milliseconds each. Furthermore, it can be seen that the use of a Hadamard fixed pattern slightly improves the mean square error for averaging over 8 subframes.

Figure 6:
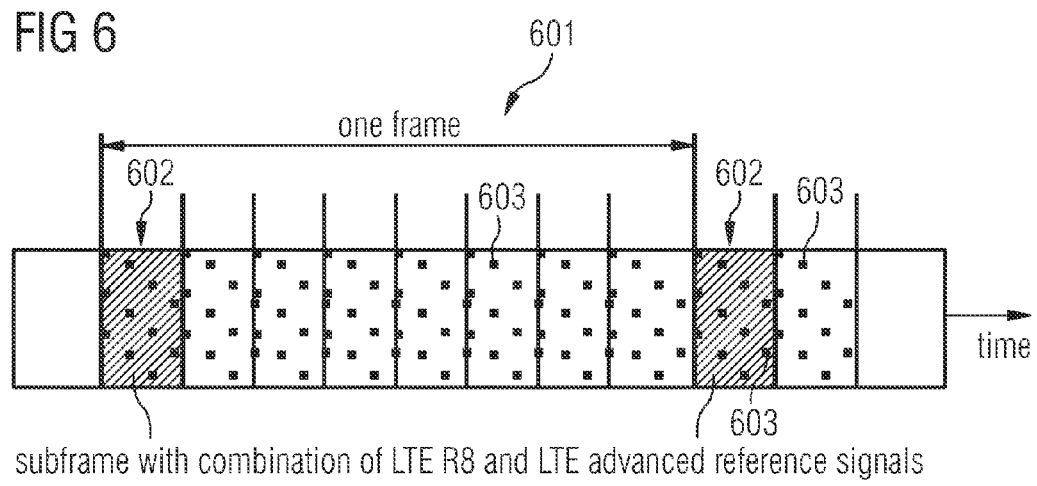
FIG. 6 schematically illustrates a subframe with common R8 and LTE advanced reference signals.
Figure 7:
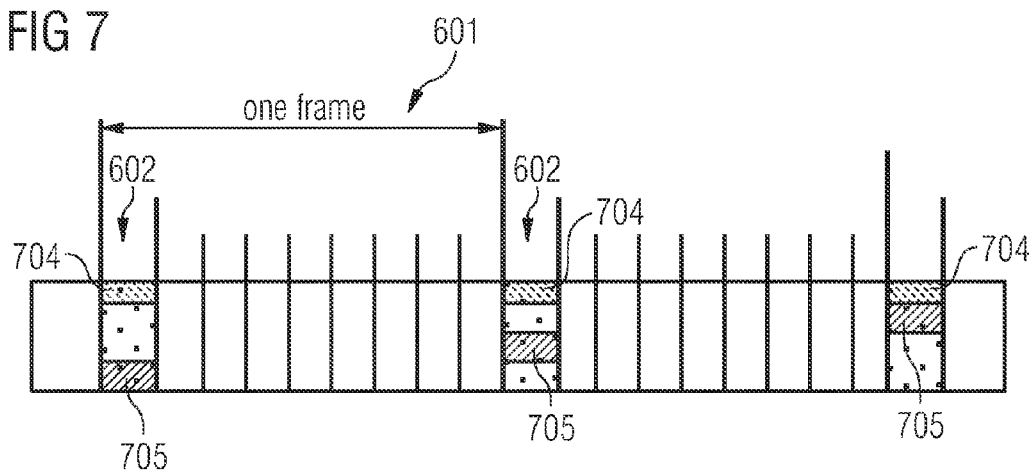
FIG. 7 schematically illustrates another transmission scheme with common R8 and LTE advanced reference signals.

FIG. 6 and FIG. 7 schematically illustrate a radio frame comprising a subframe having implemented common Release 8 CRSs and LTE Advanced CRSs. In particular, FIG. 6 shows a frame 601 comprising a subframe 602. The subframes 602 carry a combination of LTE Release 8 CRSs 603 together with LTE Advanced CRSs at the other REs not occupied by R8 CRSs. Release 8 UEs do not see any of these newly defined reference signals as the eNBs simply do not schedule any Release 8 UEs in this specific subframe.

The resulting additional overhead is in the order of 10% (one out of 10 subframes). Semistatically definition of other configurations with more or less subframes for LTE Advanced CRSs might be useful to adapt to different radio conditions.

The resulting overhead may be reduced further by transmitting common LTE Advanced reference signals only in part of the full spectrum bandwidth, which would restrict cooperation to this part of the spectrum. One may think of two different options which are indicated in FIG. 7. According to one option the CRCs are allocated to the same frequency subband 704 in each frame. Note, the location and the size of this frequency subband may be allocated semistatically by the eNBs. A second option is illustrated by the subbands 705. According to this option the used subband is changed from frame to frame. This may allow using the full frequency band for cooperation. In that case the scheduler might take into account that some parts of the spectrum have more outdated CSI information than other parts of the spectrum.

Furthermore, the resulting overhead may be reduced further by use only parts of the LTE advanced subframe for the transmission of reference signals, while other parts can be used for data transmission either to LTE Advanced UEs or even to R8 UEs, if full PRBs are free of LTE advanced reference signals.

As a general remark it should be noted that LTE Advanced UEs will have to know the locations for these additional advanced reference signals (aRSs) and if these aRSs are currently really transmitted. In case of fixed predefined and standardized locations for the aRSs all LTE Advanced UEs may expect these additional aRSs as soon as they are set into COOPA mode by an according control message. In that case further control signalling for these additional aRSs may be avoided.

A second and more flexible solution might use additional broadcast or control messages to inform the LTE Advanced UEs about the availability and the location/density of these aRSs. These broadcast or control messages may just be ignored by Release 8 UEs.

Summarizing some of the main advantages of a method according to an exemplary embodiment may be:

a) Improved performance for multi cell channel estimation, which is the most important issue for cooperative transmission schemes, as COOPA relies heavily on the CSI estimation accuracy b) For LTE Advanced there are also discussions about 8×8 MIMO schemes. These schemes may suffer from the same limitation, if multi cell channel estimation is not possible with high accuracy. So a similar approach might be applied to MIMO 8×8 as well.

c) For systems, which are defined from the scratch there are many options to optimize this performance, but for LTE Advanced backward compatibility to Release 8 may be mandatory. The methods according to exemplary embodiments of the invention provide this backward compatibility. Indeed the multi cell channel estimation accuracy in combination with Release 8 backward compatibility may be the most pressing issue, as any cooperative transmission scheme has to rely on accurate CSI knowledge for proper precoding. So multi cell channel estimation accuracy without the proposed enhancements might limit otherwise possible COOPA performance gains significantly.

d) Another application which requires accurate multi cell channel estimation is interference rejection combining algorithms (IRC). IRC may provide high gains only in case that there is detailed knowledge about all interferers, which should be reduced.

e) The schemes are very simple in implementation as just one subframe may be completely new designed, while the CRSs for AP0 to 3 are the same as for Release 8.

f) Walsh Hadamard sequences on top of the CRSs, LTE Release as well as LTE Advanced CRSs, may be easily implemented at the transmitter as well as the receiver with low implementation effort.

g) One main advantage for the proposed solution may be that there may be no data transmission in other cells during the multi cell channel estimation, so very high performance multi cell channel estimation may be provided.

h) Small to very small additional overhead, which might be about 10% and in case of further optimizations even significantly less than 10%, e.g. 2.5%.

i) excellent channel estimation quality in case of higher mobility, as all LTE advanced reference signals may be received within one subframe or even less than one subframe.

j) easy support of Release 8 UEs may be possible by just not scheduling Release 8 UEs in the LTE advanced subframe.

k) In combination with advanced schemes like COOPA HARQ or model based channel estimation which possibly provides good channel predictions, further performance improvements for fast moving UEs may be possible.

l) Another strongly related improvement may be achievable by performing a combination with optimized interpolation.

m) The channel estimation may be easily combined with the channel estimation based on LTE Release 8 CRSs.

n) By including doppler information further improvements may be possible, possibly leading to specific prediction algorithms.

o) In combination with DRX (discontinuous transmission) the UEs may benefit, as they have to perform measurements only in one out of 10 subframes.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS

101 ScaleNet results
102 ScaleNet results
103 Fo result
104 Fo result
105 Fe result
201 Central unit
202 User equipment 1
203 User equipment 2

204 Matrix
205 enhanced Node B1
206 enhanced Node B2
302 Conventional cellular layout
302 Resource block
501 Simulation results pseudo random
502 Simulation results Hadamard scheme
601 Radio frame
602 Subframe
603 Common reference signals
704 Semistatic subband
705 Variable subband

The invention claimed is:

1. A method of transmitting reference signals in a communication network from a first network element to a second network element, the method comprising:
    transmitting first type of reference signals using a first resource of a frame wherein the first type of reference signals are related to a first communication system, and
    transmitting second type of reference signals using a second resource of the frame wherein the second type of reference signals are related to a second communication system,
    wherein the first type of reference signals and the second type of reference signals are transmitted in a common subframe.

2. The method according to claim 1, wherein the first resource relates to a first frequency band of a subframe.

3. The method according to claim 2, wherein in a first frame the first reference signal is transmitted using the first frequency band; and wherein in a second frame the first reference signal is transmitted using another frequency band.

4. The method according to claim 1,
    wherein the first type, the second type, or both the first type and second type of reference signals are generated according to a Hadamard sequence.

5. The method according to claim 1, wherein the second reference signals are allocated for a specific bandwidth of the frame.

6. The method according to claim 1,
    wherein either for the transmitting of the first reference signal type in the first frame a first subband is used, or for the transmitting of the second reference signal type in the first frame a second subband is used, or both; and
    wherein either for the transmitting of the first reference signal type in a second frame a third subband is used, or for the transmitting of the second reference signal type in the second frame a fourth subband is used, or both.

7. The method according to claim 1, wherein only parts of a subframe are used for transmitting reference signals of the first type, of the second type, or of both the first type and second type.

8. The method according to claim 1, wherein the reference signals of the first type and the reference signals of the second type are combined.

9. The method according to claim 1, wherein the reference signals of the first type, of the second type, or of both the first type and the second type are used for tracking of a movement of a network element of the communication network.

10. The method according to claim 1, further comprising:
    transmitting a control message which informs the second network element about at least one of availability, location or density of the transmitted reference signals of the first type, of the second type, or of both the first and second type.

11. An apparatus consisting of a network element in a cooperative communication network, comprising:
    at least one processor, and
    at least one memory including computer program code,
    the at least one memory and the computer code configured to, with the at least one processor, cause the apparatus to at least perform the following:
    transmitting first type of reference signals using a first resource of a frame wherein the first type of reference signals are related to a first communication system, and
    transmitting second type of reference signals using a second resource of the frame wherein the second type of reference signals are related to a second communication system,
    wherein the first type of reference signals and the second type of reference signals are transmitted in a common subframe.

12. A computer program product embodied on a non-transitory computer-readable medium, in which a computer program is stored which, when being executed by a computer, the computer program product is configured to provide instructions to control or carry out at least the following:
    transmitting first type of reference signals using a first resource of a frame wherein the first type of reference signals are related to a first communication system; and
    transmitting second type of reference signals using a second resource of the frame wherein the second type of reference signals are related to a second communication system,
    wherein the first type of reference signals and the second type of reference signals are transmitted in a common subframe.

13. The apparatus according to claim 11, wherein the first resource relates to a first frequency band of a subframe.

14. The apparatus according to claim 13, wherein in a first frame the first reference signal is transmitted using the first frequency band; and wherein in a second frame the first reference signal is transmitted using another frequency band.

15. The apparatus according to claim 12,
    wherein the first type, the second type, or both the first type and second type of reference signals are generated according to a Hadamard sequence.

16. The apparatus according to claim 13, wherein the second reference signals are allocated for a specific bandwidth of the frame.

17. The apparatus according to claim 14,
    wherein either for the transmitting of the first reference signal type in the first frame a first subband is used, or for the transmitting of the second reference signal type in the first frame a second subband is used, or both; and
    wherein either for the transmitting of the first reference signal type in a second frame a third subband is used, or for the transmitting of the second reference signal type in the second frame a fourth subband is used, or both.

18. The apparatus according to claim 15, wherein only parts of a subframe are used for transmitting reference signals of the first type, of the second type, or of both the first type and second type.

19. The apparatus according to claim 16, wherein the reference signals of the first type and the reference signals of the second type are combined.

20. The apparatus according to claim 11, wherein the reference signals of the first type, of the second type, or of both the first type and the second type are used for tracking of a movement of a network element of the communication network.

* * * * *